May 25, 1937.　　　　B. M. CARTER　　　　2,081,576
PRODUCTION OF CARBON BISULPHIDE
Filed Aug. 11, 1934
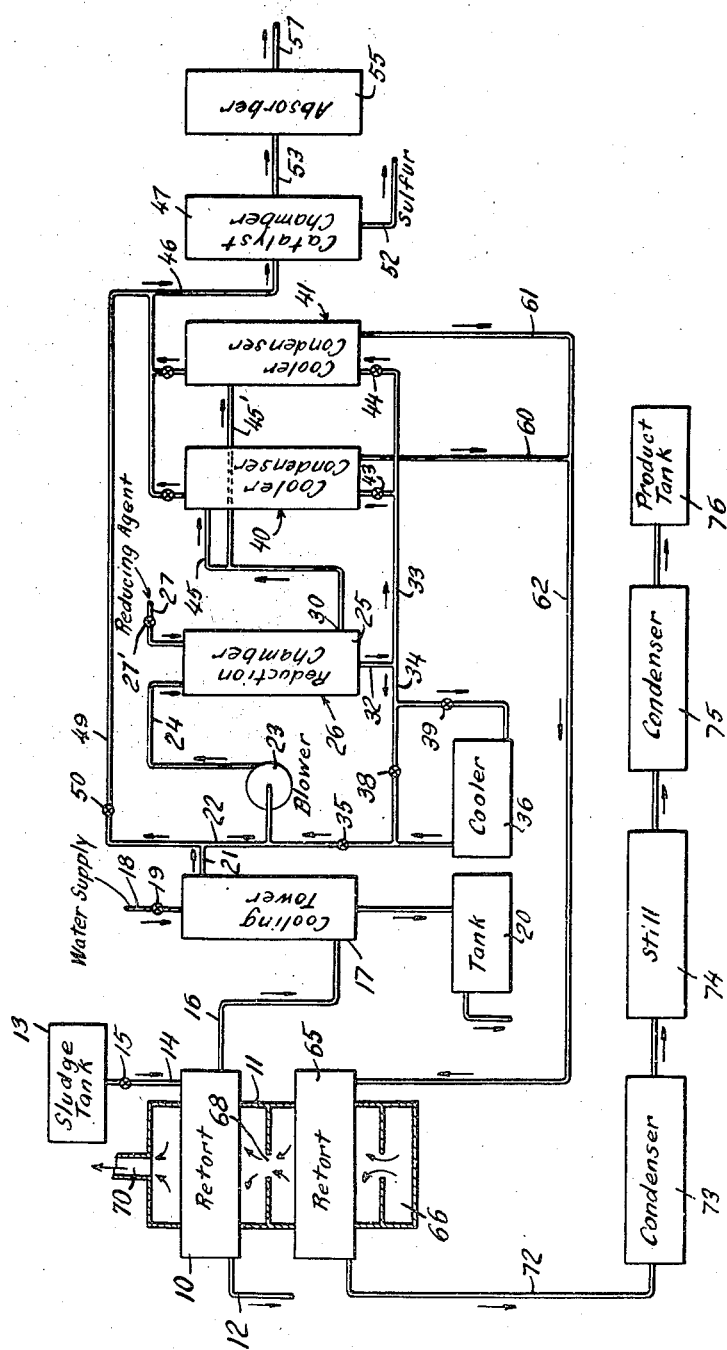
INVENTOR
B. M. Carter
BY
ATTORNEY Patented May 25, 1937

2,081,576

UNITED STATES PATENT OFFICE 2,081,576

PRODUCTION OF CARBON BISULPHIDE

Bernard M. Carter, Montclair, N. J., assignor to General Chemical Company, New York, N. Y., a corporation of New York Application August 11, 1934, Serial No. 739,374

12 Claims. (Cl. 23—206)

This invention relates to the manufacture of carbon bisulphide. More particularly the invention is directed to production of carbon bisulphide by methods involving decomposition of sulphuric acid sludges constituting waste products of oil refining processes, and utilizing such sludges as sources of carbon and sulphur needed for making carbon bisulphide.

Carbon bisulphide has been commonly produced by reacting sulphur vapor and charcoal at relatively high temperatures, e. g. around 1550–1850° F., in closed, externally heated retorts. Efforts have been made to produce carbon bisulphide by reacting sulphur vapor and other kinds of carbonaceous material, such as furnace coke and petroleum coke. These attempts have been unsuccessful, apparently because such types of carbonaceous material are not sufficiently active as is the charcoal.

One of the principal objects of the invention is to provide an inexpensive, readily available carbon or carbonaceous material sufficiently active to combine with sulphur to produce carbon bisulphide. Another important object of the invention is to devise methods for producing carbon bisulphide to make possible the use of acid sludges as the source of carbonaceous material and sulphur, which latter substances are present in various combinations in such sludges.

It has been proposed to decompose acid sludges by heating to form solid carbonaceous residues or acid sludge cokes and gas mixtures containing sulphur dioxide. In accordance with one major phase of the invention, it has been found that acid sludge cokes, such as those produced by destructive distillation of acid sludges at relatively low temperatures, containing not more than about 3% volatile matter and preferably containing substantially no volatile matter are particularly active and are especially suitable to combine with sulphur to form carbon bisulphide. More particularly the invention contemplates production of carbon bisulphide from acid sludges employing acid sludge cokes containing substantial amounts of volatile matter to reduce the acid sludge sulphur dioxide gas to sulphur, and thereafter reacting at suitable temperatures the acid sludge coke, from which the volatile constituents have been expelled during reduction of the sulphur dioxide, with sulphur formed by reduction of the acid sludge sulphur dioxide to produce carbon bisulphide.

Briefly outlined, one preferred embodiment of the process of the invention is as follows. Acid sludge is decomposed preferably by external heating at relatively low temperatures to produce a gas mixture comprising largely water vapor and sulphur dioxide, together with solid carbonaceous residues or acid sludge cokes. Preferably, decomposition of the sludge is carried only to the point at which the acid sludge coke contains substantially no undecomposed sulphuric acid, in which situation the coke does contain substantial amounts of volatile matter. The sulphur dioxide gas mixture is cooled to around normal temperature to condense and remove from the gas stream the bulk of the water vapor and condensable hydrocarbons, the condensing operation often increasing the sulphur dioxide concentration of the gas stream to as high as 85–95% by volume. Sulphur dioxide is then reduced to sulphur by means of volatile matter contained in the acid sludge coke. The reducing operation is preferably conducted so that only the volatile matter contained in the acid sludge coke is utilized to reduce sulphur dioxide, the fixed carbon being unconsumed. The exit gas mixture of the reducing zone, containing substantial quantities of elemental sulphur, is then passed through a cooler-condenser packed with acid sludge coke discharged from the reduction zone, such coke as indicated containing little or no volatile matter. After the coke in the cooler-condenser becomes saturated with the sulphur, the mass is transferred to a retort, and heated to react the sulphur and the coke to produce crude carbon bisulphide vapor which is then condensed and purified.

Details, objects and advantages of the invention may be understood from the following description taken in connection with the accompanying drawing showing diagrammatically an arrangement of apparatus suitable for use in carrying out the process of the invention.

Referring to the drawing, 10 indicates an acid sludge decomposing retort. The particular construction of the retort comprises no part of the invention, although the acid sludge is preferably decomposed in the absence of air or other diluting gas by external heating. Retort 10, for example, may consist of a fixed drum or chamber extending through a furnace setting 11, and may be equipped with a series of rabbles or a screw conveyor by which the coke formed during decomposition of the sludge is continuously discharged from the decomposing chamber and withdrawn from the apparatus through an outlet 12. A rotary kiln may be employed if desired. Acid sludge may be introduced from storage tank 13 into the decomposing chamber of the retort through a pipe line 14 controlled by valve 15.

One end of gas line 16 opens into the interior of the sludge decomposing chamber and affords means for conducting the gases and vapors generated by decomposition of the sludge into the bottom of cooling tower 17. The latter may be a vertical, cylindrical vessel provided at the top thereof with a spray head arranged to create in the tower a downwardly flowing spray of water or other cooling liquid. Water is introduced into the tower through pipe 18 having a control valve 19. Water and condensates run out of the bottom of the tower through an outlet pipe into a separating tank 20. After rising through the tower countercurrent to the cooling liquid, cooled gases are discharged from the top of the tower into gas line 21 communicating through pipe 22 with the inlet side of a blower 23, discharging through line 24 into the top of a reduction chamber 25 in a vessel 26. Reducing material, in gaseous, liquid or solid form, may be introduced into chamber 25 through an inlet 27 controlled by a valve 27'.

Vessel 26 may be a vertically disposed, cylindrical steel vessel lined with refractory material, and packed with a checkerwork of brick. The reduction chamber may be constructed to provide for one or more beds of reducing material, with provision to replenish the latter as consumed. The reduction chamber may be advantageously packed with bauxite brick which at high temperatures acts to promote the reaction, the chamber also being provided with suitable means at inlet 27 to feed solid carbonaceous material into the chamber continuously or intermittently. An outlet 30 may be provided at the bottom of the reduction chamber for continuous or intermittent discharge of acid sludge coke the volatile matter content of which has been consumed in reduction of sulphur dioxide.

Products of the reducing reaction effected in chamber 25 leave the latter through outlet 32 opening into pipe lines 33 and 34. Although temperature control of the reducing reaction in chamber 25 may be effected in different ways, it is preferred to regulate such temperatures by recycling through the reduction chamber reduction products in quantities sufficient to obtain the desired temperature control. Hence, pipe 34 communicates with the inlet side of blower 23, and the amount of reduction products recycled is controlled by valve 35. As hereinafter noted, under some operating conditions, it may be desirable to by-pass some of the gas mixture in line 34 through a cooler 36, the amount of gas mixture so by-passed being regulated by valve 38. When cooler 36 is not required in the process valve 39 is closed and valve 38 opened.

Gaseous and vaporous reduction products discharged from chamber 25 and not recycled by blower 23 flow through line 33 into one or the other of cooler-condensers 40 and 41, packed with acid sludge coke and are arranged in parallel. Passage of gas through these units is controlled by valves 43 and 44, the unabsorbed exit gases of the cooler-condensers flowing through conduit 46 to the inlet of a catalyst chamber 47 constructed preferably so as to cause the gas stream to pass through one or more bodies of catalytic material. To provide reacting proportions of reducing and reducible gases in catalyst chamber 47, sulphur dioxide gas may be by-passed from pipe 21 through conduit 49 controlled by valve 50 into line 46. Since operation is preferably conducted so that elemental sulphur produced in chamber 47 is in liquid condition, provision is made for withdrawing molten sulphur from the chamber through a pipe 52.

The gas outlet of catalyst chamber 47 is connected by a conduit 53 with an absorber 55 which functions to separate traces of sulphur and sulphur compounds from the gas stream before discharging the latter into the atmosphere through stack 57.

Coke saturated with sulphur is discharged from cooler-condensers 40 and 41 through conduits 60 and 61, and transferred as by a conveyor 62 into a retort 65 mounted in furnace setting 11. The latter is provided with a combustion chamber 66, and is built so that hot gases from the combustion chamber are utilized first to heat the material in retort 65, and then pass through an opening 68 to supply heat for decomposition of acid sludge in retort 10, the spent gases finally leaving setting 11 through stack 70.

Crude carbon bisulphide vapors flow from retort 65 through line 72 into a condenser 73. The liquid carbon bisulphide may then run into a still 74 provided with a condenser 75, the final product being recovered in tank 76.

Viewed as a whole, the process of the invention involves decomposition of acid sludge to produce sulphur dioxide gas and acid sludge coke containing substantial amounts of volatile matter. The sulphur dioxide is reduced to sulphur by means of the volatile matter contained in the decomposing retort coke. The sulphur formed in the reduction zone is then absorbed in a body of acid sludge coke discharged from the reduction zone of a previous operation and containing little or no volatile matter. The mass of coke and absorbed sulphur is then transferred to a retort and reacted to produce carbon bisulphide. The following illustrates one method for carrying out the improved process.

Sulphuric acid sludges, resulting from the refining of oils, vary widely in composition. One representative sludge was found to have a titratable acidity of about 50.8% expressed as $H_2SO_4$, and yielded on decomposition by destructive distillation about 28% residual coke, and a retort gas which, after cooling to about normal temperatures, produced about 6% condensable oils, about 35% water, the balance of the retort gas comprising sulphur dioxide, carbon dioxide, carbon monoxide, nitrogen, and uncondensable hydrocarbons and water vapor. Although the invention is not dependent upon any particular method for the destructive distillation of acid sludge to produce sulphur dioxide gas and acid sludge coke, decomposition of the sludge is preferably effected by externally heating a body of sludge, in a substantially air-tight, elongated kiln or retort, mounted in a furnace setting and arranged to provide for feed of sludge into and withdrawal of $SO_2$ gases from one end, discharge of residual coke from the other end, and maintenance of the higher temperatures at the coke discharge end and lower temperatures at the sludge inlet end. The burners in the furnace are controlled so as to maintain sludge material temperatures in the retort not less than about 300° F. at the cold end and not more than about 700° F. at the hot end. It is preferred to maintain temperatures of about 325° F. at sludge inlet end and about 450° F. at coke discharge end. On heating, the free and combined sulphuric acid contained in the sludge is reduced by hydrocarbons and/or by the carbonaceous matter present in the sludge, and the gas mixture evolved contains sulphur dioxide and water vapor, as the major constituents, together with smaller quantities of hydrocarbon vapors, carbon dioxide, carbon monoxide and nitrogen.

Preferably, decomposition of the sludge is effected at temperatures such as above noted, and under such conditions that decomposition proceeds only to approximately a point at which most of the free and combined sulphuric acid initially contained in the sludge is reduced. In this situation, the solid carbonaceous residues formed usually contain appreciable quantities of volatile hydrocarbons, and in the case of some sludges the volatile matter content of the residue may run in excess of 38-40%. This volatile matter content of the residue is particularly effective as a reducing agent in the subsequent reduction of sulphur dioxide. Accordingly, destructive distillation of the sludge is not preferably carried beyond the condition at which most of the free and combined sulphuric acid is broken up. Coke produced by the above method and discharged from the retort 10 through outlet 11 may analyze substantially as follows:

| | |
|---|---|
| Total acidity | 2.1% $H_2SO_4$ |
| Ash | 1.2% |
| Total volatile matter, including $H_2SO_4$ | 32.1% |
| Fixed carbon | 66.7% |

The gases formed in retort 10 by the decomposition of the sludge and discharged into pipe connection 16 contain generally not substantially in excess of 20% by volume of sulphur dioxide, say 75-80% water vapor, and smaller quantities of hydrocarbon vapors and carbon dioxide. For example, when decomposing a sludge such as mentioned above, the gas mixture in line 16 may contain by volume about 18% sulphur dioxide, about 79.5% water vapor, and smaller amounts of hydrocarbon vapors and carbon dioxide. The retort gas stream of this nature flows through line 16 into the bottom of cooling tower 17, and is contacted therein with a downwardly flowing stream of water introduced into the head of the tower through pipe 18. The gas stream rising through the tower is cooled, and the bulk of the water and condensable hydrocarbon vapors of the retort gas stream is condensed, and runs out of the tower with the cooling liquid into tank 20, in which the water and oily liquids may be separated by decantation or otherwise. The quantity of water run through the tower, is regulated by valve 19, so as to cool the gas to about, say, 100° F., at which temperature the gas stream enters the pipe line 21. When so operating, the cooling liquid runs out of the tower 17 at temperatures of about 160° to 180° F., and at this temperature a minimum quantity of sulphur dioxide is absorbed and retained in the cooling liquid. Since the decomposition of the sludge is effected in retort 10 substantially in the absence of air or other diluting gas, the retort gas mixture in pipe 21 after separation of water and condensable hydrocarbons is rich in sulphur dioxide. The gas mixture thus formed usually contains in excess of about 43% and generally from 70 to 90% sulphur dioxide, the balance consisting chiefly of uncondensed water vapor, and gaseous hydrocarbons with smaller amounts of carbon dioxide and carbon monoxide. When working with the particular sludge mentioned, the gas mixture in line 21 may contain, for example, by volume, 85% sulphur dioxide, 5.5% water vapor, 5% gaseous hydrocarbons, 1.2% carbon dioxide, 1.0% carbon monoxide and 2.3% nitrogen, originating in the nitrogen containing compounds present in the sludge. The amount of water vapor remaining in the gas will, of course, depend largely on the extent to which the gas is cooled to condense out water. Preferably, the gas is not completely dried, and the cooling in tower 17 should be so controlled as to leave in the gas, say, 4 to 8% water by volume, since the presence of this amount of water vapor appears to prevent formation of COS in the subsequent reduction of the sulphur dioxide to sulphur.

The sulphur dioxide gas thus produced, and containing generally in excess of around 43% by volume sulphur dioxide, is sufficiently concentrated so that it may economically be reacted with reducing agents to produce elemental sulphur in a self-sustaining reduction reaction without aid of extraneous heat. For this purpose the gas stream in line 21 is conducted into the top of reduction chamber 25.

Reduction of sulphur dioxide may be effected in chamber 25 by reacting the sulphur dioxide with suitable reducing agents either with or without catalysts. Any suitable reducing agent, as for example carbon, hydrocarbons, or hydrogen, may be utilized to bring about reduction of sulphur dioxide to sulphur. Where it is advantageous to employ the reducing agents in the form of a gas, a reducing agent, such as methane in proper quantities, may be introduced into the reduction chamber through inlet 27.

In accordance with the preferred embodiment of the present process, sulphur dioxide is reduced to elemental sulphur by contacting the sulphur dioxide with the acid sludge coke resulting from the decomposition of the acid sludge, and withdrawn from the retort 10 through the outlet 11. This reduction reaction may be effected in chamber 25 either by providing therein beds of acid sludge coke, or by making provision for the continuous passage of coke through the reduction chamber.

The gas stream in line 21, being at temperatures of about 100° F., is preheated to about 850° F. prior to introduction into the upper end of the reduction chamber. Preheating of a gas stream of the nature described, may be advantageously effected by withdrawing desired quantities of reaction products of chamber 25, at elevated temperatures, e. g. about 1100° to 1200° F., from outlet 32 by blower 23, and introducing such quantities of hot reaction products into the inlet side of blower 23 through pipe 34. The quantities of hot reaction products thus fed into the incoming sulphur dioxide gas stream may be controlled by adjustment of valve 35 according to the particular operating conditions. Ordinarily, the admixture of about 2 to 4 volumes (standard conditions) of hot reaction products from outlet 28 with about one volume of incoming sulphur dioxide gas in line 22 serves to raise the temperature of the gas mixture in line 24 to about 850° F.

The admixture with the incoming sulphur dioxide gas stream of hot reaction products serves two purposes; first, it heats up the incoming gas stream to reactive temperature, and second, it dilutes the incoming gas to such an extent as to avoid excessive temperature rise in the reduction chamber because of the exothermic reaction effected therein. Under some operating conditions, for example where the exit gas of tower 17 has a sulphur dioxide content appreciably in excess of, say, 43%, the amount of recycled reaction products required to dilute the gas stream sufficiently to avoid excessive temperature rise in the reaction chamber, may be sufficiently in excess of that required to heat the incoming gas stream so as to raise the temperature of the gas stream as it enters the reduction chamber considerably above the desired initial temperature, thus decreasing the permissive temperature rise during the reduction reaction. To avoid this condition, a controlled amount of the products in line 34 may be by-passed through cooler 36 which may be arranged to recover in liquid form any sulphur condensed, so that the gas stream on entering the reduction chamber 25 is heated only to about the desired temperature, i. e. 850° F.

Because of the catalytic properties of the acid sludge coke produced in the sludge decomposition process, the reduction reaction in chamber 25 starts immediately, and reduction of sulphur dioxide to sulphur by hydrocarbons proceeds. When operating with cokes containing substantial amounts of volatile hydrocarbons, the volatile hydrocarbons in the residue are initially utilized in the reduction of the sulphur dioxide. It appears that the reduction takes place selectively to a substantial extent, i. e. the sulphur dioxide appears to be reduced first by the volatile hydrocarbons and as the volatile hydrocarbons become exhausted, fixed carbon of the coke tends to become consumed. In accordance with the preferred modification of the process, the reduction of the sulphur dioxide is effected substantially entirely by the volatile hydrocarbon content of the residue and when the volatile matter of the residue becomes substantially exhausted, residual coke is removed from the reaction chamber. This mode of operation permits the economical use of the volatile matter contained in the decomposing retort coke, and at the same time provides for discharge from the reaction chamber of an acid sludge coke containing substantially no volatile matter, which coke, in accordance with the invention, has been found to be admirably adapted for use in production of carbon bisulphide.

The reduction reaction involved is exothermic, and although reduction is initiated at the low temperature of about 900° F., the temperature tends to rise rapidly. At high temperatures, hydrogen sulphide in variable quantities is formed, and accordingly, as it is desired to avoid formation of excessive amounts of hydrogen sulphide in the exit gases of the reaction chamber, the temperature of the reaction is preferably not permitted to exceed about 1200° F. Generally, operations are conducted so that the temperature of the products leaving the reaction chamber is about 1150° F.

Where the sulphur dioxide gas is produced for example by decomposing acid sludge substantially in the absence of air and hence does not contain substantial quantities of diluting nitrogen, the sulphur dioxide concentration of the gas entering the reduction chamber 25 should preferably be not substantially less than about 13% by volume so that the subsequent reduction reaction will be self-sustaining, thus adding to the economies of the process. It will be recalled preheating of the gas prior to introduction into the reduction chamber is accomplished by introducing, into the incoming raw gas stream, hot reaction products from the gas line 30. In order to raise the temperature of the incoming gas from 100° F. to approximately 850° F., it is usual under most operating conditions to introduce into about one volume of incoming raw gas about two to four volumes of reduction products from line 30. This admixture of reaction products with raw gas reduces the sulphur dioxide concentration of the latter, and where the initial sulphur dioxide concentration of the raw gas is approximately 43%, the admixture of one volume thereof with about 2.8 volumes of reduction products, would decrease the sulphur dioxide concentration of the resultant gas mixture in line 24, just before entering the reduction chamber 25, to about 13%, the preferably minimum sulphur dioxide concentration at which the reduction reaction is self-sustaining. Accordingly, the sulphur dioxide concentration of the raw gas stream in line 21 should preferably not be appreciably less than about 43%, since admixture therewith of sufficient reaction products to preheat the incoming raw gas and control the temperature conditions in the reduction chamber would decrease the sulphur dioxide concentration of the gas entering the reduction chamber to less than about 13%, below which concentration the reduction reaction would not be self-sustaining when employing a gas of the nature described. If because of the nature of the sludge or the method of decomposition, the $SO_2$ concentration in line 21 should be less than about 43%, the cool gases may be preheated to reaction temperature by any appropriate indirect heat exchange means.

The exit gases and vapors of the reduction chamber in outlet 32 contain sulphur generally as vapor, a relatively large amount of water vapor, appreciable amounts of carbon dioxide, and smaller quantities of sulphur dioxide, hydrogen sulphide, carbon monoxide and possibly some hydrocarbons. For example, when operating with a gas approximately of the composition mentioned above, the exit gases may contain by volume about 23% sulphur, 2.3% $SO_2$, 6.0% $H_2S$, 48.8% $CO_2$, 1.5% CO, 11.8% $H_2O$, 4.3% hydrocarbons, and 2.3% $N_2$.

That portion of the gaseous and vaporous products of the reduction chamber 25 not recycled by blower 23 flows through line 33 into one or the other of cooler-condensers 40 and 41. In practice these condensers may be disposed in parallel, and are arranged so that they may be filled as through conduits 45 and 45' with cooled acid sludge coke containing little or no volatile matter discharged from the bottom of reduction chamber 25. It will be understood for example when condenser 40 is being employed to absorb sulphur, condenser 41 is cut out of the system by closing valve 44. Assuming gases in line 33 are passed into cooler-condenser 40 packed with acid sludge coke containing little or no volatile matter, and preferably less than about 3% volatile matter, the coolers are operated so that the sulphur laden gases will be cooled to a point preferably within the range between the boiling point of the water and the melting point of sulphur (212° F. to 248° F.). The major portion of the sulphur contained in the gas stream is condensed and deposited as a solid on and throughout the carbon packing and is thereby separated from other vapors and gases of the gas stream. The exit gases of cooler-condenser 40 comprise largely sulphur dioxide, hydrogen sulfide, carbon dioxide and water vapor which pass through the condenser largely unabsorbed.

As the gas stream passing through line 46 may contain appreciable quantities of sulphur dioxide and hydrogen sulphide, operations are preferably so conducted that these gases contain a slight excess of hydrogen sulphide. In such case, necessary quantities of sulphur dioxide may be by-passed through valve 50 and line 49 into pipe 46 to provide therein a mixture containing approximately reacting proportions of hydrogen sulphide and sulphur dioxide. This gas mixture is then introduced at temperatures of around 220–230° F. into chamber 47, and sulphur dioxide and hydrogen are reacted therein in the presence of a catalyst preferably activated bauxite to produce sulphur in accordance with the equation $$2H_2S + SO_2 = 2H_2O + 3S$$

Other catalysts such as iron oxide and pyrites cinder may be employed.

Preferably the reaction taking place in chamber 47 should be so regulated as to avoid temperature rise in the gas stream of more than about 300° F. Should conditions be such that the temperature of the reaction tends to rise to a greater extent, provision may be made for controlling the reaction temperature by circulating suitable amounts of tail gases from the stack 57. As observed, the reaction in chamber 47 is conducted so that sulphur formed therein is in the molten condition and runs out of the chamber through connection 52. The exit gases of catalyst chamber 47 flow through line 53 into an absorber 55 and are contacted with adsorbent materials such as activated carbon, silica gel or tarry oils to remove traces of sulphur and sulphur compounds from the gas stream before the latter is discharged into the atmosphere from stack 57.

Gases from line 33 are passed through condenser 40 until sulphur has been condensed to such an extent that the mass contains in the neighborhood of about 5 pounds of sulphur to one pound of acid sludge coke, the approximate quantities of sulphur and carbon required for the reaction between carbon and sulphur to form carbon bisulphide. It is generally desirable to proceed so that the mass contains an excess of carbon over that needed for the reaction between the sulphur and carbon. When the desired degree of saturation has taken place in condenser 40, valve 43 is closed and the gases are passed through condenser 41. The mass in condenser 40 is discharged through line 60, and passed into retort 65. The saturated carbon discharged from condenser 40 represents the raw material containing both ingredients required for production of carbon bisulphide in the retort 65. One purpose in passing the sulphur laden gases through the coke in the condensers is to effect separation of sulphur vapor from the $SO_2$, $H_2S$, $CO_2$ and $H_2O$, and particularly the $CO_2$ and $H_2O$ which would produce COS and $H_2S$, under the temperature conditions existing in the retort 65.

The retort 65, mounted in setting 11, may comprise a fixed elongated cylindrical tube provided with means for gradually working solid material through the retort. Any suitable fuel is burned in combustion chamber 66 under conditions such that the hot gases circulating through that portion of setting 11 surrounding retort 65 maintain temperatures within the retort of around 1550 to 1850° F. to effect reaction of carbon and sulphur to form carbon bisulphide. The sulphur saturated coke is fed into the head end of the retort, and the sulphur is vaporized. The coke and sulphur pass cocurrent through the retort, the reaction forming carbon bisulphide vapor. Since it is preferred to operate with an excess of carbon, there is present in the discharge end of the retort carbon available to react with any small amounts of unreacted sulphur which might tend to leave the retort. Excess carbon is discharged from the retort, and may be burned as fuel in combustion chamber 66 or more desirably may be returned to either of the condensers 40 or 41 for use in absorbing more sulphur.

Both the carbon bisulphide and the sludge decomposition reactions are endothermic and are wasteful of fuel which is one of the major items of expense in prior methods for making carbon bisulphide. The present process is carried out so that hot combustion gases generated at a single source, in chamber 66, are first employed to effect reaction of sulphur and carbon in retort 65 and are then utilized to decompose the sludge in retort 10. Gases leave that portion of setting 11 surrounding retort 65 through opening 60 at temperatures of about 1200–1300° F., and circulate through the section of setting 11 surrounding the retort 10. The waste hot gases of the carbon bisulphide reaction may be used in this manner because the gases surrounding retort 10 should not exceed about 1200° F.

The exit gas of retort 65 comprises largely carbon bisulphide vapor and relatively small amounts of $H_2S$ and COS, and some free sulphur. The vapors and gases are cooled in condenser 73 sufficiently to liquefy the carbon bisulphide. Residual gases of the condenser may contain $H_2S$, COS and appreciable amounts of $CS_2$ vapor and may be passed through an absorber, not shown, containing for instance straw oil, by means of which the $CS_2$ may be separated from COS and $H_2S$, and subsequently recovered from the oil. The liquid carbon bisulphide in condenser 73 may contain dissolved sulphur, and hence may be run into still 74 and distilled for example by steam to vaporize $CS_2$, the sulphur remaining in the still bottoms. The vapors formed in the still 74 may be passed through a condenser 75, and residual vapors of the condenser passed through straw oil as in an absorber previously mentioned to recover the relatively small amount of $CS_2$ contained in the condenser exit gases. The residual purified carbon bisulphide liquor remaining in condenser 75 is run into a product tank 76.

With respect to that part of the invention relating to the reaction of sulphur and acid sludge coke, it will be understood the sulphur may be obtained from any source and need not be that resulting from reduction of sulphur dioxide gas obtained by destructive decomposition of acid sludge or otherwise. Methods other than that described may be employed for decomposing the acid sludge. Decomposition of sludge may if desired be carried on to such a point as to substantially completely eliminate volatile matter from the resulting solid carbonaceous residue thus producing acid sludge coke containing substantially no volatile constituents, and in a condition ready for use as an absorbing agent in the cooler-condensers 40 and 41, or in a retort such as 65 for reaction with sulphur. Where sludge decomposition is effected so that the carbonaceous residue discharged from retort 10 contains substantial amounts of volatile matter, the latter may be removed from the carbonaceous residue for example by heating to about 2000–2200° F., instead of using the volatile matter to effect reduction of sulphur dioxide in which case some other reducing agent may be employed. Also, a sulphur condenser such as a waste heat boiler may be substituted for the cooler-condensers 40 and 41 and the sulphur recovered in the form of liquid which may be vaporized and reacted with acid sludge coke to produce carbon bisulphide.

I claim:

1. The method for making carbon bisulphide which comprises reacting at a sufficiently elevated temperature sulphur and coke, obtained by decomposing by heating sludge material derived from acid treatment of petroleum, containing not more than about 3% volatile matter to form carbon bisulphide, and recovering carbon bisulphide.

2. The method for making carbon bisulphide which comprises reacting at a sufficiently elevated temperature sulphur and coke, obtained by decomposing by heating sludge material derived from acid treatment of petroleum, containing substantially no volatile matter to form carbon bisulphide, and recovering carbon bisulphide.

3. The method for making carbon bisulphide which comprises forming a mixture of solid sulphur and coke, obtained by decomposing by heating sludge material derived from acid treatment of petroleum, containing not more than about 3% volatile matter, introducing the mixture into a reaction zone, reacting the coke and sulphur at a sufficiently elevated temperature to form carbon bisulphide, and recovering carbon bisulphide.

4. The method for making carbon bisulphide which comprises absorbing sulphur vapor in a mass of coke, obtained by decomposing by heating sludge material derived from acid treatment of petroleum, containing not more than about 3% volatile matter and forming a mass comprising solid sulphur and coke in amount in excess of that reacting with sulphur to form carbon bisulphide, then reacting the sulphur and coke at a sufficiently elevated temperature to form carbon bisulphide, and recovering carbon bisulphide.

5. The method for making carbon bisulphide from sludge coke which comprises decomposing acid sludge material derived from acid treatment of petroleum by heating to form sulphur dioxide and sludge coke, reducing the sulphur dioxide to elemental sulphur, reacting the sulphur and sludge coke containing not more than about 3% volatile matter at elevated temperatures to form carbon bisulphide, and recovering carbon bisulphide.

6. The method for making carbon bisulphide from sludge coke which comprises decomposing sludge material derived from acid treatment of petroleum by heating to temperatures not substantially less than about 325° F. and not substantially more than about 450° F. to form sulphur dioxide and sludge coke, reducing the sulphur dioxide to elemental sulphur, reacting the sulphur and sludge coke containing not more than about 3% volatile matter at elevated temperatures to form carbon bisulphide, and recovering carbon bisulphide.

7. The method for making carbon bisulphide from sludge coke which comprises decomposing material derived from acid treatment of petroleum by heating to form sulphur dioxide and sludge coke containing a substantial amount of volatile matter, reducing the sulphur dioxide to elemental sulphur, reducing the volatile matter content of the sludge coke to not more than about 3%, reacting the sludge coke and the sulphur at elevated temperatures to form carbon bisulphide, and recovering carbon bisulphide.

8. The method for making carbon bisulphide from sludge coke which comprises decomposing sludge material derived from acid treatment of petroleum by heating to form sulphur dioxide and sludge coke containing a substantial amount of volatile matter, reducing the sulphur dioxide to elemental sulphur by means of volatile matter contained in the initial sludge coke under conditions such as to reduce the volatile matter content of the residual sludge to less than about 3%, reacting the elemental sulphur and the residual sludge coke at elevated temperatures to form carbon bisulphide, and recovering carbon bisulphide.

9. The method for making carbon bisulphide from sludge coke which comprises decomposing sludge material derived from acid treatment of petroleum by heating to form sulphur dioxide and sludge coke, reducing the sulphur dioxide to form a gas mixture containing elemental sulphur, contacting the gas mixture with sludge coke containing not more than about 3% volatile matter to separate the sulphur from other reaction products, reacting the sulphur and the sludge coke to form carbon bisulphide, and recovering carbon bisulphide.

10. The method for making carbon bisulphide from sludge coke which comprises decomposing sludge material derived from acid treatment of petroleum by heating to form sulphur dioxide and sludge coke containing a substantial amount of volatile matter, reducing the sulphur dioxide by means of volatile matter contained in the initial sludge coke by contacting the sulphur dioxide and sludge coke under conditions such as to reduce the volatile matter content to not more than about 3% and to form a gas mixture containing elemental sulphur, contacting the gas mixture with residual sludge coke of the reduction reaction to separate sulphur from other reduction products, reacting the sulphur and residual sludge coke at elevated temperatures to form carbon bisulphide, and recovering carbon bisulphide.

11. The method for making carbon bisulphide from sludge coke which comprises decomposing sludge material derived from acid treatment of petroleum by heating substantially in the absence of air to form a hot sulphur dioxide gas mixture and to produce sludge coke containing a substantial amount of volatile matter, cooling the gas mixture to separate condensable vapors therefrom, contacting in a reduction zone the resulting sulphur dioxide gas and the sludge coke at elevated temperatures to effect reduction of sulphur dioxide to elemental sulphur by means of volatile matter contained in the sludge coke and under conditions such as to remove substantially all of the volatile matter from the sludge coke, contacting the sulphur containing exit gas mixture of the reduction zone with sludge coke discharged from the reduction zone to separate sulphur from other gaseous and vaporous reduction products, reacting the sludge coke and the sulphur at elevated temperatures to form carbon bisulphide, and recovering carbon bisulphide.

12. The method for making carbon bisulphide from sludge which comprises decomposing sludge material derived from acid treatment of petroleum by heating at elevated temperatures to form sulphur dioxide and sludge coke, reducing the sulphur dioxide to elemental sulphur, reacting the sulphur and sludge coke containing not more than about 3% volatile matter by heating to elevated temperatures in excess of the acid sludge decomposition temperature by means of hot combustion gases, and then using said hot gases to decompose acid sludge.

BERNARD M. CARTER.